No. 634,260. Patented Oct. 3, 1899.
W. A. CLARK.
DIVIDED PULLEY.
(Application filed Nov. 23, 1898.)
(No Model.)
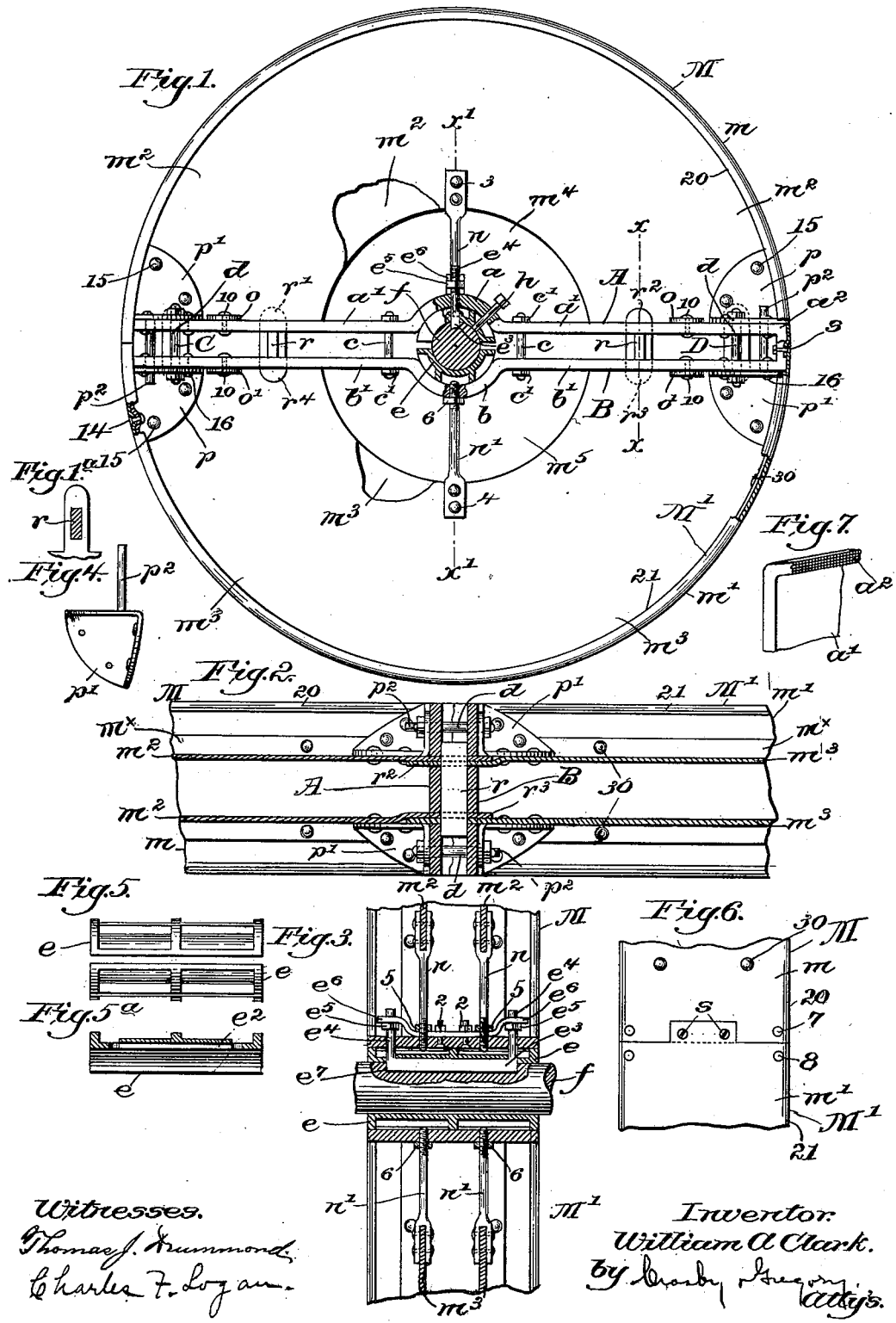
Witnesses.
Thomas J. Drummond
Charles F. Logan
Inventor.
William A. Clark.
by Crosby & Gregory
attys.
THE NORRIS PETERS CO., PHOTO-LITHO., WASHINGTON, D. C.

UNITED STATES PATENT OFFICE.

WILLIAM A. CLARK, OF BOSTON, MASSACHUSETTS.

DIVIDED PULLEY.

SPECIFICATION forming part of Letters Patent No. 634,260, dated October 3, 1899.

Application filed November 23, 1898. Serial No. 697,283. (No model.)

*To all whom it may concern:*

Be it known that I, WILLIAM A. CLARK, of Boston, county of Suffolk, State of Massachusetts, have invented an Improvement in Divided Pulleys, of which the following description, in connection with the accompanying drawings, is a specification, like letters and figures on the drawings representing like parts.

This invention has for its object the production of a novel divided or multipart pulley that may be readily applied to shafting of any required size, my improved pulley being preferably composed of sheet metal, the hub of the pulley and its arms carrying the belt-receiving portions being integral and the belt-receiving portions being applied detachably to the said hub and its arm.

My improved pulley is shown as provided with an interchangeable bushing, the same being retained in place by a suitable locking device, shown as a key.

The particular features in which my invention consists will be hereinafter described, and set forth in the claims at the end of this specification.

Figure 1 in side elevation partially broken out, shows a pulley embodying my invention in one particular form. Fig. 1$^a$ is a cross-section of one of the dowels $r$. Fig. 2 is a sectional detail in the dotted line $x$, Fig. 1, looking to the right. Fig. 3 is a sectional detail in the dotted line $x'$, Fig. 1. Fig. 4 is a detail showing one of the corner-stays. Fig. 5 shows an exterior view of the hub-bushing detached; Fig. 5$^a$, a longitudinal section of part of the bushing shown in Fig. 5. Fig. 6 is a detail showing the joint between the belt-supporting portions at the face thereof. Fig. 7 is an enlarged detail of the face of one of the lips.

In the production of my improved pulley I take, preferably, sheet-steel of suitable width, thickness, and length to compose the two arms A B, which when united together constitute the hub or central part of the pulley to be described. These pieces of sheet-steel are subjected to the action of dies, which form upon them concavo-convex hub portions $a\,b$, and extended therefrom there are portions $a'$ or $b'$, and at the end of said portions the metal is bent to constitute lips $a^2\,b^2$. In practice the ends of these lips are made to abut one against the other, and preferably these ends will be so shaped as to enable the lip of one to engage the lip of the other, so that one lip cannot slip in any direction on or with relation to the other lip. This may be effected by notching or corrugating the ends of the lips, as in Fig. 7, or these lips may be prevented from slipping one on the other by forcing the lips together when they are hot, so that the metal at the face of one lip engages the metal at the face of the other lip unequally or the portion of the metal of one lip embeds itself more or less in the portions of the hot metal of the other lip, thus making a joint which will not slip one part on the other.

The hub parts so far described extend, it will be noticed, from the center of the pulley substantially to its peripheral edge, and these two arms A B are held together about the bushing and the shaft by suitable stud-bolts $c\,c$ and $d\,d$, any desired number of said bolts being employed.

The bolts $c$ are shown as extended through the portions $a'\,b'$, near the concavo-convex hub portions $a\,b$, and by turning the nuts $c'$ on these bolts the concavo-convex portions may be drawn together to assume proper circular outline and embrace the bushing $e$ to be described, said bushing being upon a shaft $f$.

The bushing is shown as composed of a plurality of parts, and preferably said bushing will be made in skeleton form or it will have at its outer side a series of spaces to thereby reduce its weight.

Fig. 5 shows the exterior of the bushing $e$. One part of this bushing may have (see Figs. 3 and 5$^a$) a keyway $e^2$ to receive a key $e^3$, the key herein shown having suitable threaded stems $e^4$, upon which are applied adjustable nuts $e^5$. This key besides standing in the keyway of the bushing also enters a longitudinal keyway $e^7$ in the shaft $f$. I desire to press this key firmly into the keyway $e^7$ of the shaft. To provide for this, I have employed a pressing device $e^6$, which is suitably bolted firmly to the concavo-convex portion $a$ of the part A, the bolts uniting the said parts being represented at 2. The key is of a shape and size in cross-section to substantially fill the open area of the two keyways. Each part or half of the bushing is contained in its own concavo-convex portion of the arm A or B. The arm A is shown as containing that part of the bushing which has coöperating with it the key. This part of the bushing will be applied to the arm A when it is disconnected from the arm B, the arm A, having, however, applied to it a clamp $e^6$, and the key will be first inserted in the key-seat of the bushing, the threaded parts of the key being passed through holes in the said bushing and through holes in the concavo-convex portion $a$ of said arm A, and thereafter, while the said threaded ends are between the outside of the portion $a$ and the under side of the clamp $e^6$, suitable nuts $e^5$ are applied to the said threaded portions, and the latter will then pass through two holes in the clamp, and thereafter the two arms A B of the hub are clamped together and the nuts are rotated on the threaded portions to act against the ends of the clamp. Holding one part of the bushing in fixed relation to the other part or portion $a\, b$ of the central or hub part of the pulley causes the other part or half of the bushing to be properly maintained in position. I prefer for the best results to employ a key such as shown and described, yet this invention is not in all instances limited to the use of the key shown, or, in fact, to any key, as I may employ a set-screw, as $h$, (see Fig. 1,) it being inserted through a hole in the hub portion $a$ and extended through the bushing, the end of the set-screw acting against the shaft $f$. In fact, both the set-screw and the key may be used to advantage, as the set-screw obviates any possibility of the bushing and pulley sliding on the shaft, it affording additional security to the action of the key.

The exterior or belt-carrying portion of the pulley is shown as composed of a plurality of sectors M M', each sector presenting a broad face $m$ or $m'$, the edges being provided with downturned flanges 20 21. Connected with the interior of these sectors M M' there are a plurality of webs $m^2\, m^3$, each of sector shape and flanged at its exterior, as at $n^{\times}$, the flanged parts of the webs being united to the belt-sustaining sectors by means of suitable rivets 30. Some of these rivets are shown in Figs. 2 and 6 and another in Fig. 1 by breaking out a part of the flange referred to. The drawings show each belt-sustaining sector as provided with two webs; but a greater number of webs might be employed, if desired. Each web is cut away circularly at its shorter edge to leave open spaces $m^4\, m^5$ in the pulley to thereby gain access readily to the bolts and devices which have to be manipulated in applying and taking off the pulley. Each web has also a suitable ear, as $o\, o'$, and these ears are attached, respectively, to the arms A B by means of suitable rivets 10. The webs have connected to them suitable stay-bolts $n\, n'$, (see Figs. 1 and 3,) said bolts being fixed at one end to said webs by suitable rivets 3 4, the opposite threaded ends of said stay-bolts having a sliding fit in pits made in the hub portions $a\, b$, said threaded ends receiving adjustable nuts 6, which bear on the outer sides of the said hub portions $a\, b$, said nuts serving to support the pulley against belt strain, and by adjusting said nuts on said stay-bolts the hub portion may be accurately centered, so that the exterior of the pulley will run true. I may use any desired number of these stay-bolts, arranging them about any portion of the hub portions $a\, b$ according to the stiffness desired for the pulley.

The sectors M M' of the pulley, they receiving the belt, are further fixed each to its carrying-arms A B by suitable rivets 7 8, (see Fig. 6,) extended through the lips $a^2\, b^2$. The sectors M M' and the webs and the arms A B are further joined together by like corner-pieces $p\, p'$, used in pairs, one of said corner-pieces carrying a pin $p^2$, which is extended through a hole in its opposed or fellow corner-piece. One of these corner-pieces—viz., the one carrying the pin—is shown separately in Fig. 4, and they are shown in position in Fig. 1. The corner-pieces are connected with the sectors M M' by suitable rivets 14, one of which is shown at the left in Fig. 1 by breaking out the flange 21, and the corner-pieces are connected with the webs by suitable rivets 15 and to the arms A B by suitable rivets 16, and when putting these corner-pieces in place the corner-piece having the pin $p^2$ will be extended through suitable holes in the arms A B, and thereafter the pin will enter a hole in the opposed or mating corner-piece. Having applied the sectors M M' and their connected webs, respectively, to the arms A and B, the same must be united about a shaft to constitute the pulley, this being done by the stud-bolts $c$ and $d$ and also by suitable dowels $r$, to be described. The stud-bolts $d$ pass through holes in the corner-pieces $p$ and $p'$ and through holes in the portions $a'\, b'$ of the arms A B. (See Figs. 1 and 2.) These dowels are of substantially quadrilateral shape in cross-section (see Fig. 1$^a$) and pass through holes in ears $r'\, r^2$ and $r^3\, r^4$, extended from the webs $m^2$ and $m^3$, the pairs of ears $r'$ and $r^2$ overlapping one the other and the pairs of ears $r^3$ and $r^4$ overlapping one the other. These ears when the two halves of the pulley are put in place are made to pass, respectively, through suitable slots in the arms A and B, the said ears are made to overlap between the said arms sufficiently to bring holes in the said ears in line, and thereafter said holes have inserted into them the dowels $r$, as shown best in Fig. 2. These dowels when in position lie between the contiguous faces of the portions $a'\, b'$ of the arms A B, said dowels being held firmly in position by the action of the said arms A and B against them, said arms acting by a force due to the nuts on the stud-screws $c$ and $d$. By clamping these dowels as described all possibility of their moving longitudinally is obviated, and the two halves of the pulley are firmly bound together. The holes in the ears $r'$, $r^2$, $r^3$, and $r^4$ are made to substantially fit the sides of the dowels, so that the arms A and B may be prevented from any liability of moving at right angles to the shaft $f$ due to belt strain.

The sectors M M' are further united by means of screws $s$, inserted through overlapping portions or lips at the meeting ends of the said sectors. (See Figs. 1 and 6.)

It will be noticed that the lips $a^2$ $b^2$ constitute an important feature of this invention, as they constitute a means for separating the arms A B at the proper distance from each other, so that the connected hub portions $a\,b$ may be moved one toward the other, while the lips abut one against the other. The stud-screws serve the purpose of moving the hub portions $a\,b$ toward each other in order that they may assume the proper circular shape and grasp and hold between them the interchangeable bushing.

By an "interchangeable" bushing I mean a bushing having a standard outside measurement, the inside or shaft bearing portion of different bushings varying, so that I may apply, for instance, to a pulley having a four-inch bore a bushing having its face next the shaft of any desired circle to fit any desired shaft.

The flanges $m^\times$ at the convexed outer portions of the webs occupy a substantially true circle, which insures that the sectors M and M', applied thereto by the rivets 30, may occupy a substantially true circle, thus making a substantially true circular pulley. Further, a pulley constructed of sheet-steel, as herein shown and described, possesses great strength and lightness, and the lighter the pulley the less the strains due to momentum and the less centrifugal force generated by it when run at high speed, so that the pulley cannot burst and leave the shaft. It is not unusual for a cast-iron pulley run at high speed to burst due to its centrifugal action. Further, by making the pulley of sheet-steel it is possible to readily produce an evenly-balanced pulley, which is not the case when the pulley is made of cast metal, for so far as I am aware it is not possible to make a practical cast-metal pulley except the same be balanced. The webs are connected to the concave seats of the sectors M and M' at a short distance from the longitudinal centers of said sectors, and these sectors are greatly stiffened by flanging them at their sides, and their edges are obviated from wearing the belts.

Having described my invention, what I claim as new, and desire to secure by Letters Patent, is—

1. A divided pulley presenting for its central body a plurality of bent arms provided at their ends with lips, means to unite said arms between their ends and cause the said lips to abut, and a belt-receiving face composed of a plurality of sectors having their ends interlocked and connected one with the other, the said ends being also firmly united with the lips at the ends of said arms at opposite sides the point of junction of the ends of the sectors, whereby said sectors may be kept in connection with said arms should the arms be separated, substantially as described.

2. A divided pulley presenting two arms, having each a concavo-convex hub portion, extended portions $a'$, $b'$, each provided with a lip, the lip of one arm abutting an opposed lip, means to force the said lips firmly in contact and position the concavo-convex parts of the said arms and connected belt-receiving portions or sectors, substantially as described.

3. A divided pulley presenting at its belt-receiving portion, a plurality of sectors, and a plurality of arms having concavo-convex portions and lips, the abutting ends of said lips being interlocked one with the other, and means to hold said arms firmly together, substantially as described.

4. A divided pulley presenting a belt-receiving portion composed of a plurality of sectors, and a plurality of flanged webs connected with and supporting said sectors throughout their length, and a plurality of arms to which only the ends of said webs are connected, substantially as described.

5. A pulley composed of a plurality of sheet-metal sectors, each sector having riveted to it the continuous flange of a plurality of webs, and a plurality of separable arms having hub portions, both said webs and sectors being directly attached to said arms, substantially as described.

6. A pulley having a divided central part presenting hub portions and connected extended arms, said arms having slots, and belt-receiving portions having webs provided with ears having holes, said ears being inserted through said slots, and dowels entering the holes in said ears, substantially as described.

7. A pulley having a divided central part presenting hub portions and connected extended arms, said arms having slots and belt-receiving portions having webs provided with ears having holes, said ears being inserted through said slots, dowels entering the holes in said ears and standing between the said arms, and means to act on said arms to cause them to clamp said dowels firmly, substantially as described.

8. A pulley composed of sheet-metal sectors and flanged webs carrying the same, said webs having ears at their ends, combined with the central arms or plates, and means to fix said ears to said arms or plates, substantially as described.

9. A pulley composed of sheet-metal belt-receiving sectors M, M', and a plurality of webs attached to each of said sectors, central arms and corner-pieces, and means to unite said corner-pieces to said sectors, webs and central arms, substantially as described.

10. A pulley composed of sheet-metal belt-receiving sectors M, M', and a plurality of webs attached to each of said sectors, central arms and corner-pieces, means to unite said corner-pieces to said sectors, webs and central arms, said corner-pieces being employed in pairs, one corner-piece of each pair having a projecting pin, to operate substantially as described.

11. A sheet-metal pulley presenting a plurality of central arms or plates, a plurality of webs having ears adapted to overlap each other when the said arms are in operating position, and a plurality of sectors, combined with dowels extended through holes in said ears, the latter being overlapped, the sides of said dowels fitting the holes in said ears, thereby lessening the liability of the pulley getting out of true circular shape, substantially as described.

12. A pulley composed of a plurality of arms bent to present concavo-convex hub portions, and belt-receiving portions or sectors having connected webs united to said arms, and stay-bolts located between the said concavo-convex portions and the inner edges of said webs, to operate substantially as described.

13. A pulley having a detachable bushing composed of a plurality of parts, combined with a key having a threaded shank, and means to adjust said key readily with relation to the center of said pulley and said key-seat, substantially as described.

14. A pulley having a detachable bushing composed of a plurality of parts, combined with a key having a threaded shank, said key entering a key-seat in said bushing, and a clamp acting on said key, substantially as described.

15. A shaft having a key-seat, a pulley having central arms, and a detachable bushing composed of a plurality of parts, combined with a key having a threaded shank extended therefrom through one-half of said bushing and the concavo-convex part of one of said arms, said key entering the key-seat in said bushing and said shaft when the two parts of the pulley are separated or applied to said shaft, and means to thereafter confine the two parts of said pulley together on said shaft, substantially as described.

16. A divided pulley having its central portion composed of arms, a shell-like bushing having a key-seat and applied to one of said arms, said bushing having a threaded shank and a nut applied to said shank, combined with a clamp acting on said nut to normally press the said key in a radial direction, that it may be locked into the key-seat of a shaft having a key-slot of the substantial length of the key, substantially as described.

17. A light-weight pulley composed of sheet metal, presenting a plurality of central arms having concavo-convex portions with connected arms and lips, and sheet-metal belt-receiving portions or sectors provided each with a plurality of webs and attached to said central arms, substantially as described.

18. A sheet-metal pulley consisting essentially of the following parts, viz: a plurality of sectors flanged at their side edges, a plurality of flanged webs united to said flanged sectors, a plurality of central arms having concavo-convex hub portions with connected arms provided at their ends with lips, means to connect said webs with said arms, a bushing, and means to connect said arms, one with the other, and force them to hold firmly in place the said bushing, substantially as described.

19. A sheet-metal pulley presenting a plurality of arms or plates, each having a hub portion, and presenting at the ends of the arms lips which are adapted to abut one against the other, a series of webs connected with each of said arms or plates, a plurality of sectors connected with said webs, the ends of said sectors being united to the lips of said arms and the ends of the sectors being united one to the other, substantially as described.

In testimony whereof I have signed my name to this specification in the presence of two subscribing witnesses.

WILLIAM A. CLARK.

Witnesses:
GEO. W. GREGORY,
ALEX. C. PROUDFIT.